(12) United States Patent
Kris et al.

(10) Patent No.: US 7,310,443 B1
(45) Date of Patent: Dec. 18, 2007

(54) AUTOMATIC RED EYE DETECTION AND CORRECTION IN DIGITAL IMAGES

(75) Inventors: Mark Kris, Richmond Hill (CA); Mikhail Mironov, Thornhill (CA)

(73) Assignee: Sonic Solutions, Inc., Santa Clara, CA (US)

( * ) Notice: Subject to any disclaimer, the term of this patent is extended or adjusted under 35 U.S.C. 154(b) by 810 days.

(21) Appl. No.: 10/665,849

(22) Filed: Sep. 17, 2003

(51) Int. Cl.
*G06K 9/00* (2006.01)

(52) U.S. Cl. ........................ 382/167; 382/162
(58) Field of Classification Search ................. 382/167
See application file for complete search history.

(56) References Cited

U.S. PATENT DOCUMENTS

| | | | |
|---|---|---|---|
| 5,432,863 A * | 7/1995 | Benati et al. ................ | 382/167 |
| 5,990,973 A * | 11/1999 | Sakamoto ................... | 348/576 |
| 6,204,858 B1 * | 3/2001 | Gupta ........................ | 345/600 |
| 6,407,777 B1 * | 6/2002 | DeLuca ...................... | 348/576 |
| 6,631,208 B1 * | 10/2003 | Kinjo et al. ................ | 382/167 |
| 6,665,434 B1 * | 12/2003 | Yamaguchi ................. | 382/162 |
| 6,728,401 B1 * | 4/2004 | Hardeberg .................. | 382/167 |
| 6,798,903 B2 * | 9/2004 | Takaoka ..................... | 382/167 |
| 6,868,178 B1 * | 3/2005 | Frei et al. ................... | 382/162 |
| 6,895,112 B2 * | 5/2005 | Chen et al. ................. | 382/167 |

* cited by examiner

*Primary Examiner*—Wenpeng Chen
*Assistant Examiner*—Yuzhen Ge
(74) *Attorney, Agent, or Firm*—Martine Penilla & Gencarella, LLP

(57) ABSTRACT

A method for the automatic detection and correction of red eye in a digital image is disclosed. The method includes defining a digital image in a hue-saturation-intensity (HSI) color space, and identifying a red eye region in a digital image. Using HSI criteria, identified regions are filtered to discard areas unlikely to be the result of red eye effect, and then a plurality of algorithms are used to apply a color correction to each pixel in the identified red eye region. The color correction manipulates each pixel of the red eye region remove the red eye effect. The method is automatic, and requires no input from a user to define the red eye region, to identify the true color of the red eye region, or to apply the color correction.

12 Claims, 6 Drawing Sheets

AUTOMATIC RED EYE DETECTION AND CORRECTION IN DIGITAL IMAGES

BACKGROUND OF THE INVENTION

1. Field of the Invention

The present invention relates generally to digital image processing and editing, and more specifically, to methods for automatic detection and removal of red eye effect in digital images.

2. Description of the Related Art

Taking photographs of people and using flash often results in an artifact in the photograph commonly known as "red eye." The artifact can be present in an image taken from either a traditional film camera with flash, or a digital camera with flash. The artifact is generally manifested as an apparent red coloration of the iris of the eye, instead of the natural eye coloration, and is also referred to as "flash effect."

Red eye is generally caused by the reflection of the intense light of a flash from the blood vessels of the retinas of a person's eyes. The degree of dilation of a subject's eyes varies the apparent size of the red eye area. Because increased eye dilation results in a corresponding increase in red eye, it is common for attempts to reduce red eye to include measures to decrease eye dilation such as increasing ambient lighting, having a subject stare into a bright light just prior to taking a picture using flash, and so forth.

FIG. 1A is a diagram of an eye 10 illustrating a typical red eye effect as it might appear in a photographic image. Outer iris area 12 may or may not be rendered with apparently normal coloration (e.g., blue, green, brown, etc.). Pupil area 14 typically exhibits the redness that is known as red eye, and a small region 16 within pupil area 14 typically includes a bright white flash reflection.

Whether a photograph is taken with a traditional film camera or with a digital camera, the photograph can be, and often is, rendered as a digital image that is capable of being edited, cropped, re-touched, or otherwise modified. Popular digital photo editing applications include tools for image editing that include the ability to modify or correct red eye effect in image subjects. Such tools are generally manually manipulated to the effected area, and then may be implemented in a manual or semi-automatic mode to correct red eye. FIG. 1B shows the eye 10 image of FIG. 1A with a typical digital image editing tool set of a computer program such as a photo editing application of a computer system implemented for red eye correction. Eye 10 image includes outer iris area 12, pupil area 14, and small region 16 within pupil area 14 having bright white flash reflection. A selection box 18 may be defined around the general area of the red eye effect to be corrected. A user or operator usually defines the selection box 18 around the area desired to be corrected. In other words, a computer user or operator must identify an area or region in a digital image, which is stored as electrical signals in a computer system and displayed on a computer display output, and in some manner effect a selection or identification of the area for correction.

In some applications, a simple selection box 18 is sufficient to identify the area. If the photo editing application includes some measure of semi-automatic correction, the defining of the selection box 18 may be all that is required of the user or operator prior to indicating an acceptance or rejection of the semi-automatic red eye correction within the selected or identified area. In some applications, a computer user or operator must scale the digital image to achieve as large an image as possible, or desired, and then must correct the color within the pupil region 14 of the eye 10 one pixel at a time until the desired color correction is effected. Typically, a pointer 20, which may be in the shape of an arrow as illustrated, or in the shape of a paintbrush, a fountain pen, a sprayer, and so forth depending on the specific editing application, is used to select each pixel within the effected area, one at a time, and then each selected pixel is changed to a desired color. In semi-automatic applications, the pointer 20 is typically used to define, size, and position the selection box 18 over the area to be corrected.

In both the manual and the semi-automatic editing applications, some deliberate act of a user or operator is required to either identify, or to identify and to correct, the red eye effect. The process can be tedious, time-consuming, and require patience and manual dexterity. What is needed is a method for automatic detection and correction of red eye effect in digital images, effective in digital images rendered from a digital imaging device or from a traditional camera and film.

SUMMARY OF THE INVENTION

Broadly speaking, the present invention fills these needs by providing a method and system for automatically identifying and correcting red eye effect in digital images. The present invention can be implemented in numerous ways, including as a process, an apparatus, a system, a device, a method, or a computer readable media. Several embodiments of the present invention are described below.

In one embodiment, a method for performing red eye correction in an image is provided. The method includes providing a digital image, and identifying a red eye region in the digital image. A color correction is then applied to each pixel in the identified red eye region. The method for performing red eye correction in an image is automatic and requires no input from a user to define the red eye region, or to apply the color correction.

In another embodiment, a method for performing red eye correction in a digital image is provided. The method includes identifying red areas in the digital image, and filtering out non-red eye red areas from the identified red areas. The filtering includes the disregarding of areas too large for red eye effect, areas of an inappropriate shape to have red eye; areas of insufficient color intensity; areas of insufficient brightness dispersion, and areas failing to match a pre-determined spectral criteria. The method further includes defining a region having red eye effect, and applying a color correction to the defined region. The method is performed automatically and without user input to define or to correct the region having red eye effect.

In a further embodiment, computer readable media having program instructions for removal of red eye effect in a digital image is provided. The computer readable media includes program instructions for automatically defining a region of the digital image having red eye effect, and for automatically applying a color correction to the defined region. User input is not required to define the region of the digital image having red eye effect, and user input is not required to apply the color correction to the defined region.

The advantages of the present invention over the prior art are numerous. One notable benefit and advantage of the invention is that the identification and correction of red eye is automatic. A user need not open an image editing program or function to produce quality images that have been corrected for red eye.

Another benefit is that in the automatic detection and correction of red eye effect, if an area is inadvertently defined and identified that contains skin, embodiments of the present invention provide for minimizing the effects of applied algorithms in low saturated human skin areas.

Other advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention for the automatic identification and color correction of red eye effect in digital images is described. In preferred embodiments, a method for the automatic identification and correction of red eye includes the automatic defining and identifying of hard red areas, the application of a plurality of filters, and the application of a plurality of algorithms to automatically correct identified red eye. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1A:
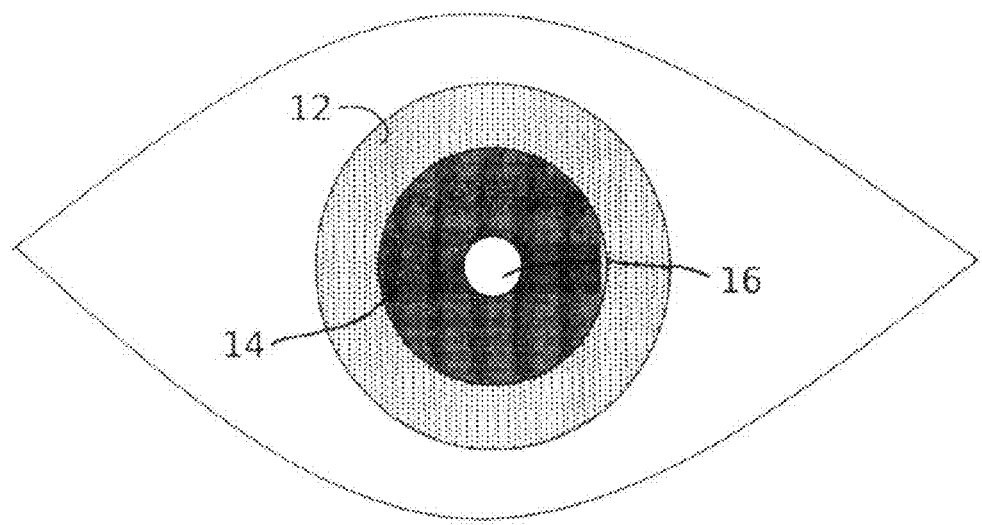
FIG. 1A is a diagram of an eye illustrating a typical red eye effect as it might appear in a digital image.
Figure 1B:
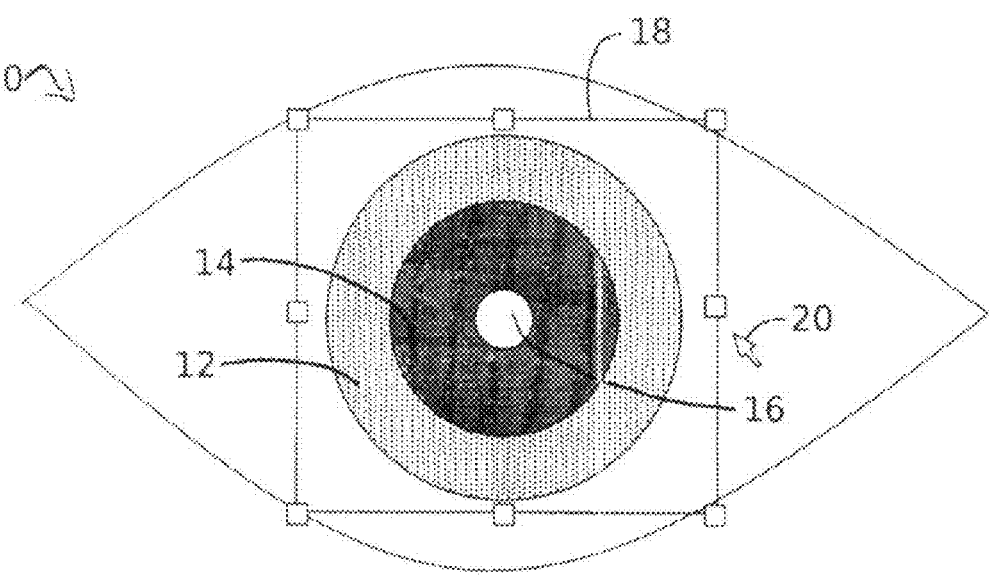
FIG. 1B shows the eye image of FIG. 1A with a typical digital image editing tool set implemented for red eye correction.
Figure 2:
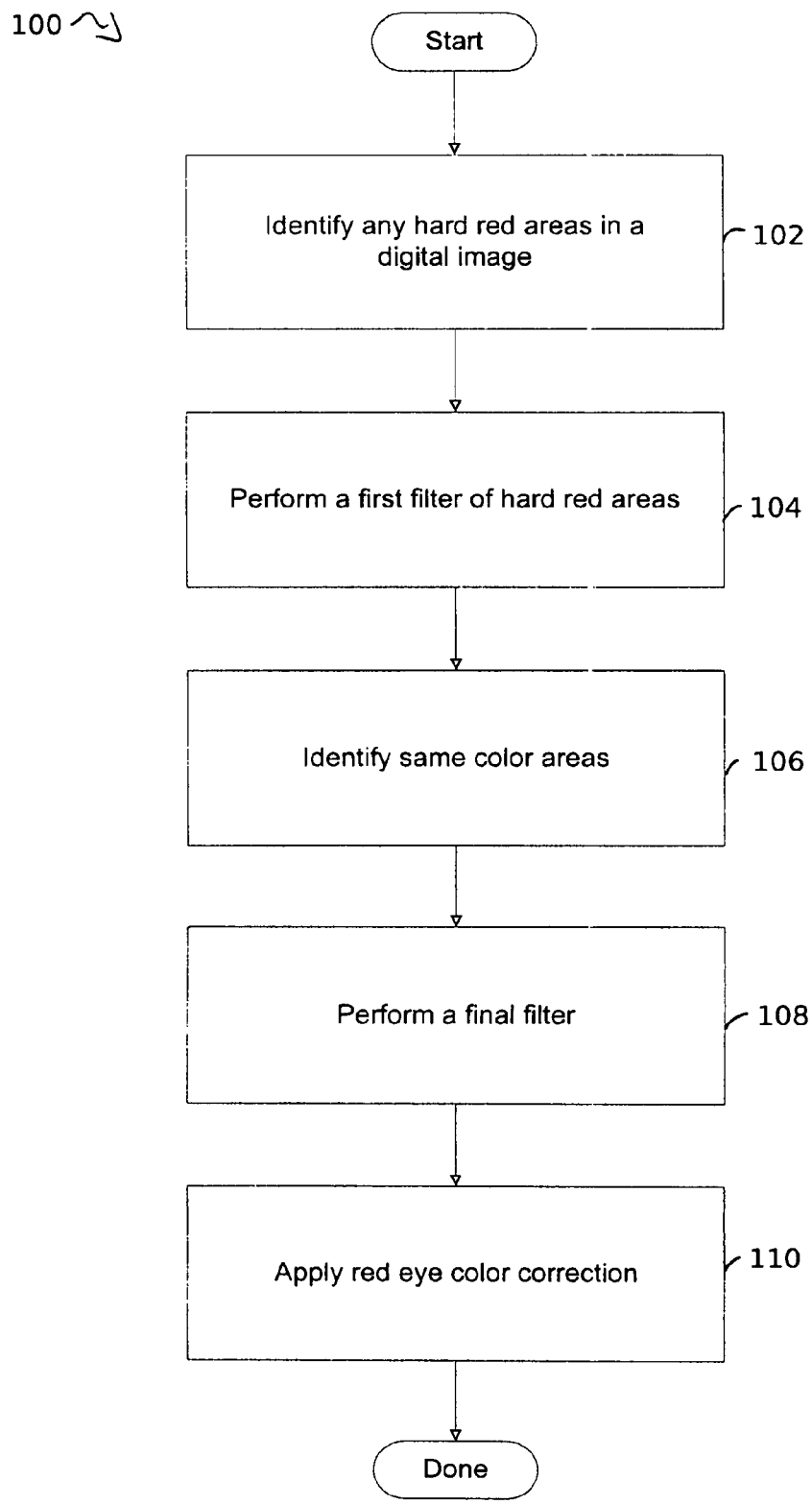
FIG. 2 is a high-level flowchart diagram illustrating method operations for automatic red eye removal in accordance with one embodiment of the present invention.

FIG. 2 is a high-level flowchart diagram 100 illustrating method operations for automatic red eye removal in accordance with one embodiment of the present invention. Flowchart diagram 100 is used to provide an overview of embodiments of the present invention, and further detail is provided in following illustrations and text.

The method begins with operation 102 in which "hard" red areas are identified in a digital image. As will be described in greater detail below, a hard red area, also known as a "strict" red area, is any area or region in a digital image in which the pixels meet a defined criterion or set of criteria for hue interval (see FIG. 3A) and the polygon that interrelates saturation and intensity (see FIG. 3B). In general, for each detected hard red area, embodiments of the present invention identify and calculate the following values:

average for hue
average for saturation
average for intensity
virtual weight center
the real color center, which is defined as the point in the hard red area with the closest hue-saturation-intensity (HSI) value to the averages for the detected area The method continues with operation 104 in which a first filter is performed of the detected hard red areas. In one embodiment of the invention, the first filter of operation 104 is a size filter to filter out very large hard red areas. By way of example, the size filter of operation 104 may filter out every detected hard red area if the width, the height, or both the width and the height of an area-surrounding rectangle defined around the detected area exceeds a predefined value. In one embodiment of the invention, the pre-defined length or width of the area-surrounding rectangle is 50 pixels.

In operation 106, same color areas are identified. In one embodiment, same color areas originate from existing hard red areas and are built around real color centers of the detected hard red areas. As will be described in greater detail below, a real color center is defined as a point in the detected hard red area with the closest HSI value to that of the averages for the detected hard red area. The same color area is the area that consists of a continuous set of pixels built around a real color center and having a color that is similar, also referred to as a "same color," to that of the real color center. The same color areas, plus the subset of filtered hard red areas, comprise a new set of final red areas that are subject to further filtering.

The method then provides for performing a final filter in operation 108. In one embodiment of the invention, the final filtering of operation 108 consists of a series of filters designed to discard the areas that cannot be considered part of red eye. In one embodiment, the series of filters, described in greater detail below, include filters for size, shape, color weight, brightness dispersion, and spectral criteria.

Following the final filtering of operation 108, the method concludes with operation 110 in which red eye color correction is applied. In one embodiment, a color correction algorithm, or plurality of color correction algorithms, is applied to every red area that remains after the final filtering of operation 108. A color correction algorithm applies a defined mathematical color conversion to every pixel in the area-surrounding rectangle. In one embodiment, the color correction algorithm changes "color" by manipulating saturation and intensity only, and without manipulating hue. In another embodiment, the color correction algorithm or algorithms change color by matching all identified red pixels in the identified red area to the natural eye color. Further, the algorithm preserves the colors close to those of human skin if an area containing such color is incorrectly defined. Upon application of color correction, the method is done.

Embodiments of the present invention use a hue-saturation-intensity (HSI) color space because an HSI color space is believed to most closely represent human color perception. In one embodiment, all color manipulation such as like color comparisons and color distance calculations are done in the HSI color space. Each dimension (H, S, I) is scaled to a [0.0; 1.0] segment.

Figure 3A:
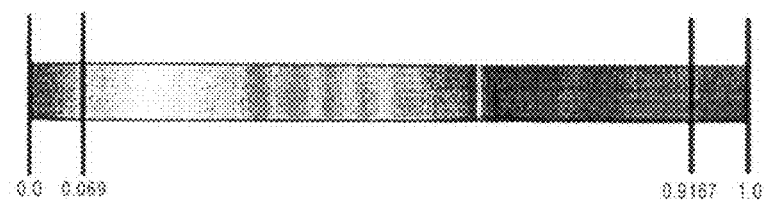
FIG. 3A shows the hue segments as defined, in accordance with one embodiment of the invention.

Turning back to operation 102 in which any hard red areas are identified in the digital image, one embodiment of the present invention applies hue segments to define a hard red area. In one embodiment, the hue segments within the defined [0.0; 1.0] spectrum are defined by the coordinates [0.0; 0.1377] and [0.8321; 1.0]. In another embodiment, the coordinates [0.0; 0.0694] and [0.9167; 1.0] within the [0.0; 1.0] spectrum define the hue segments. FIG. 3A shows the hue segments as defined, in accordance with one embodiment of the invention. In one embodiment of the invention, the identified hue segments, illustrated in FIG. 3A, are used to define and identify hard red areas.

Figure 3B:
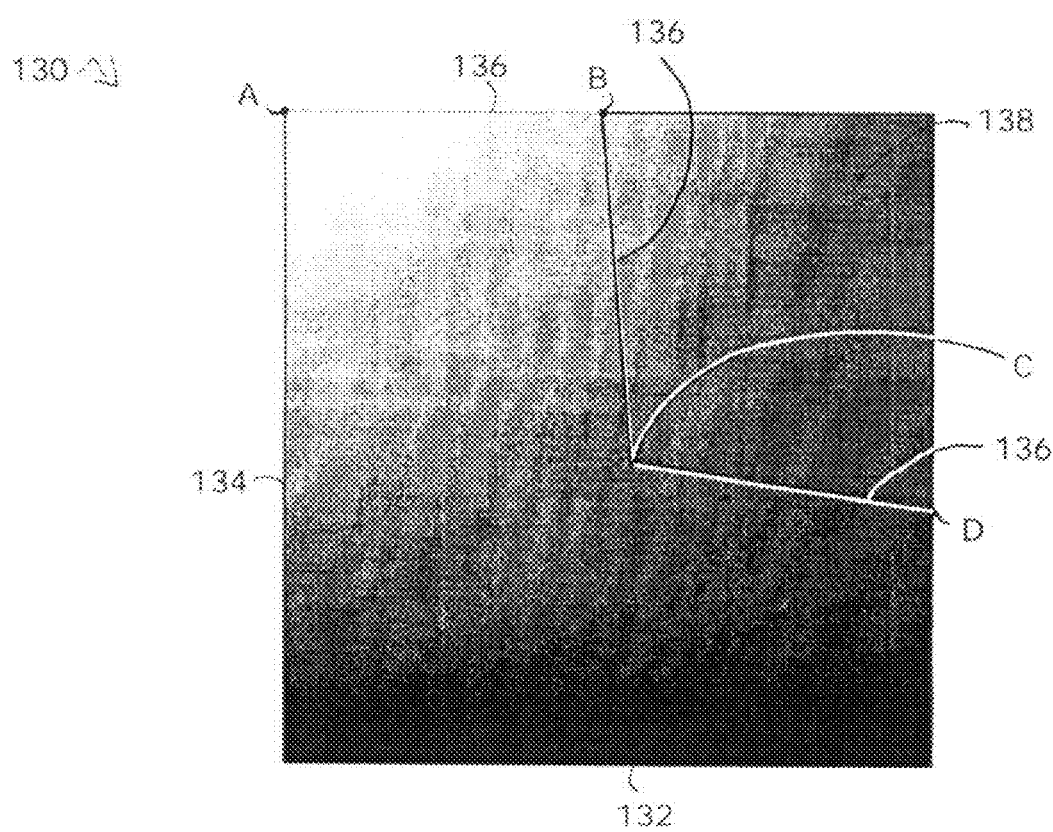
FIG. 3B is a plot of saturation verses intensity in the HSI color space in accordance with one embodiment of the present invention.

FIG. 3B is a plot 130 of saturation verses intensity in the HSI color space in accordance with one embodiment of the present invention. Plot 130 is also used to define and identify hard red areas, and shows saturation along the horizontal axis 132, and intensity along the vertical axis 134. In one embodiment of the present invention, a poly-line 136 is defined by the points A at [0.0; 1.0], B at [0.5; 1.0], C at [0.55; 0.34], and D at [1.0; 0.3], and defines the relationship between saturation and intensity for the hard red areas. Poly-line 136 divides both saturation along 132 and intensity along 134 to define a generally upper quadrant region 138, also referred to has defining a polygon 138, having high intensity, also referred to as high brightness, and high saturation colors. In one embodiment of the invention, the generally upper quadrant region 138, combined with the hue segments described above in reference to FIG. 3A, define the hard red areas or regions to be detected in a digital image.

Figure 4:
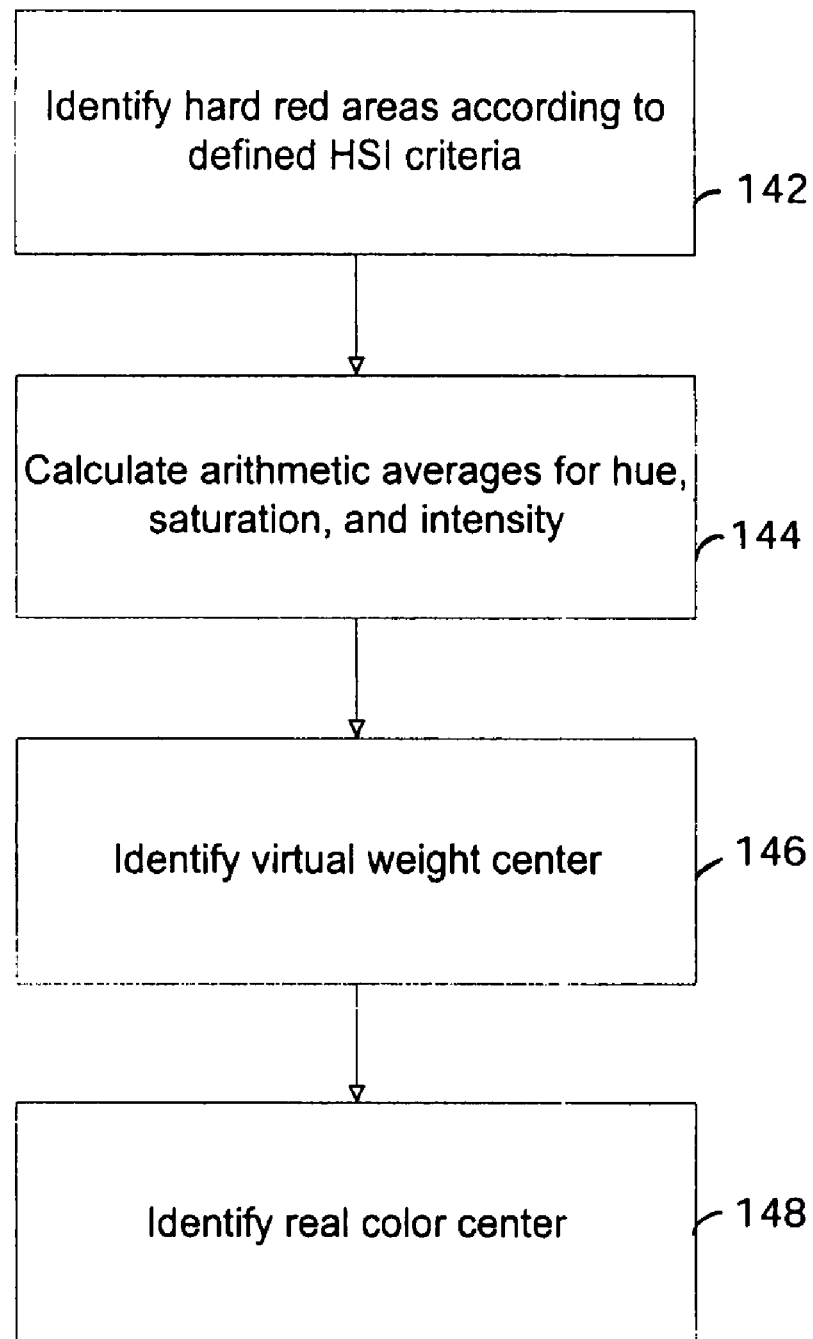
FIG. 4 illustrates more detailed operations performed in operation 102 of the flowchart diagram shown in FIG. 2.

FIG. 4 illustrates more detailed operations performed in operation 102 of flowchart diagram 100 shown in FIG. 2. As shown in FIG. 4, the identifying of any hard red areas in a digital image of operation 102 includes identifying hard red areas according to defined HSI criteria in operation 142, calculating arithmetic averages for hue, saturation, and intensity in operation 144, identifying the virtual weight center in operation 146, and identifying the real color center in operation 148. FIGS. 3A and 3B, and associated text, describe the identification of the hard red areas according to defined HSI criteria. For every hard red area identified in operation 142, arithmetic averages for hue, saturation, and intensity are calculated as shown in operation 144. Additionally, a virtual weight center is identified (operation 146), and a real color center is identified (operation 148). In one embodiment, the real color center is defined as the point in the hard red area with the closest HSI to the averages for the identified area. In one embodiment, the coordinates for the virtual weight center are determined for the identified hard red area by summing the X-value of each X-Y coordinate defining a pixel within the identified hard red area and dividing the result by the number of pixels in the identified area, and summing the Y-value of each X-Y coordinate defining a pixel within the identified hard red area and dividing the result by the number of pixels in the identified area. The resulting X-Y coordinates define the virtual center of the identified hard red area.

The following formula is used to calculate the color distance between the particular point and the calculated averages:

$$\text{Color\_Dist} = \text{ABS}(H_A - H_p) + 0.3 * \text{ABS}((S_a + I_a) - (S_p + I_p))$$

Ha = average hue
Hp = point's hue
$S_a$ = average saturation
$S_p$ = point's saturation
$I_a$ - average intensity
$I_p$ = point's intensity The color distance, in one embodiment, describes a similarity of color between pixels. The closer the similarity of color between two pixels, the shorter the color distance between the two pixels will be. The above formula is the mathematical expression of color distance, or color similarity.

Looking again at FIG. 2, operation 104 calls for performing a first filter of the identified hard red areas. In one embodiment of the invention, the first filter is a size filter to discard those areas pre-defined to be too large to be red eye effect. In one embodiment, the size filter filters out every area in which an area-surrounding rectangle defined around the identified hard red area has a width or height exceeding a pre-defined value. In one embodiment of the present invention, the pre-defined value is 50 pixels. In another embodiment, the pre-defined value includes a width or height of the area-surrounding rectangle exceeding 7% of the image dimension.

Following a first filter, embodiments of the present invention provide for identifying same color areas around the real color center of the identified hard red area in operation 106 of FIG. 2. As described above in reference to FIG. 4, the real color center was identified for each of the identified hard red areas. For those hard red areas surviving the first filter, same color areas are next identified. In some cases, identifying hard red areas yields only one, or a few pixels of a red eye area or region. The identifying of same color areas around the real color center results in more precisely defining a red eye area.

In some cases, the identified hard red area is part of a larger red area of the digital image. In these cases, identified same color areas will likely be quite large, and will therefore be filtered out in later filtering. In one embodiment of the invention, the following formulae are used to identify same color areas around the identified real color center:

For every pixel to be in the same color area:

If HueDuff = ABS($H_c - H_p$) and SI_Radius$^2$ = ($S_c - S_p$)$^2$ + ($I_c - I_p$)$^2$ then
  (HueDuff < 0.02)    and    SI_Radius$^2$ < 0.45$^2$
  (HueDuff < 0.035)    and    SI_Radius$^2$ < 0.3$^2$
  (HueDiff < 0.045)    and    SI_Radius$^2$ < 0.1$^2$ HueDiff = hue difference
SI_Radius = saturation/intensity radius
Hc = real color center hue
Hp = point's hue
Sc = real color center saturation
Sp = point's saturation
Ic = real color center intensity
Ip = point's intensity Therefore, in one embodiment, if the hue of a pixel differs from the hue of the real color center by less than 0.2, and the pixel's saturation/intensity coordinates lie within the circle having a radius of 0.45 about the real color center, then the pixel is defined to be in the same color area. Additional embodiments are described in the above formulae.

Figure 5:
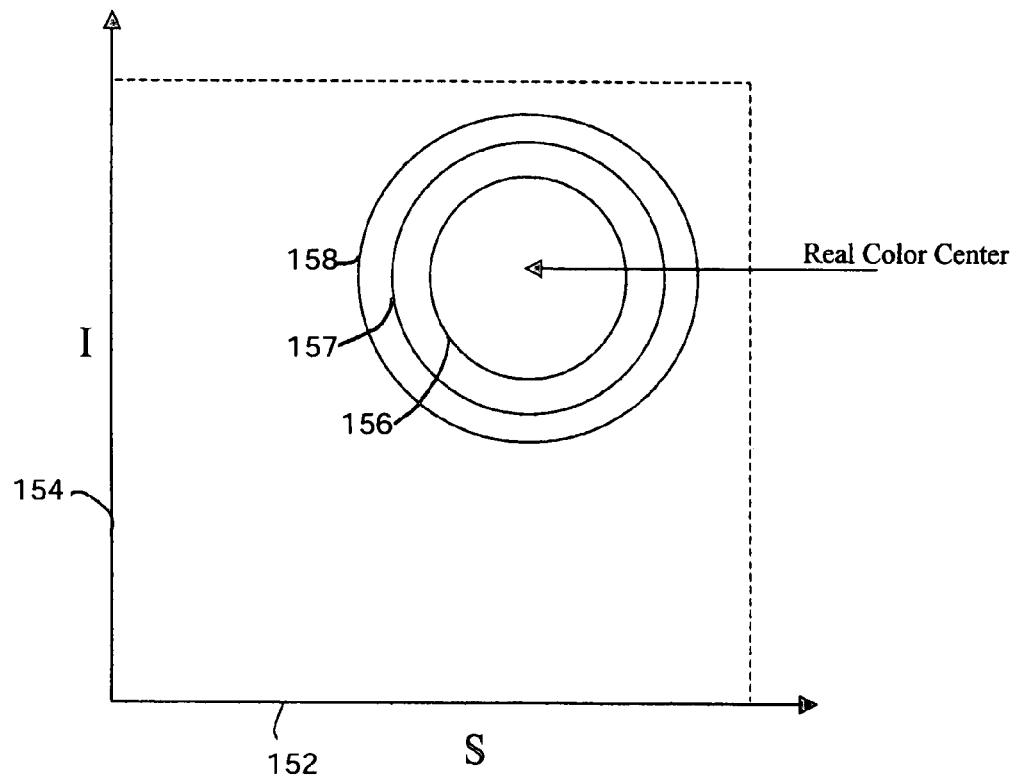
FIG. 5 illustrates the identifying of same color areas in accordance with one embodiment of the present invention.

FIG. 5 illustrates the identifying of same color areas in accordance with one embodiment of the present invention. FIG. 5 shows a plot 150 of saturation verses intensity. Saturation is identified as the horizontal axis 152, and intensity is identified as the vertical axis 154. As defined by the formulae above, each circle represents the SI_Radius defined by HueDiff. The smallest (inner most) circle at 156 represents an SI_Radius$^2$<0.12 defined by HueDiff<0.045. The middle circle at 157 represents SI_Radius$^2$<0.32 defined by HueDiff<0.035. And the largest (outer most) circle at 158 represents SI_Radius$^2$<0.452 defined by HueDiff<0.02. In one embodiment of the invention, the same color areas are added to the identified hard red areas that survived the initial filtering of operation 104, to constitute a new set of final red areas subject to more filtering.

In one embodiment of the present invention, a final filtering, illustrated by operation 108 of flowchart diagram 100, is performed on the set of final red areas. The final filtering includes a plurality of filters designed to discard those areas of a digital image that are not, or have been so defined that they essentially cannot be, areas or regions of red eye effect, according to defined filtering criteria. In one embodiment of the invention, all surviving red areas are subjected to a plurality of filters and, for any red area that fails to pass the criterion or criteria of any filter, the red area is discarded from the set of red areas.

In one embodiment of the invention, the plurality of filters includes the six filters illustrated in Table 1 below. The Size Filter is the same filter applied in the first filtering of operation 104 in flowchart diagram 100 illustrated in FIG. 2. The Size Filter is the only filter, in one embodiment, that is applied more than one time to identified red areas.

TABLE 1

| Filter | Use |
| --- | --- |
| SizeFilter | Filters out very large areas. In one embodiment, filers out every area having an area-surrounding rectangle with a width or height exceeding a pre-defined value. In one embodiment, the pre-defined value is 50 pixels. |
| CircleLikeFilter | Requires the identified red area to have a circle-like shape. CircleLikeFilter uses an area-surrounding rectangle to further define an identified circle-like shape. In one embodiment, requires that the longest dimension of the area-surrounding rectangle, either the length or height, is not more than 30% longer than the shorter dimension. In one embodiment, the CircleLikeFilter also requires that the virtual weight center of the identified red area does not deviate from the geometric center of the area-surrounding rectangle by more than 37.5% in either the horizontal or vertical orientation. |
| StripesFilter | Filters out very oblong areas. The StripesFilter uses an area-surrounding rectangle in addition to the values of the longest area dimension and the shortest area dimension. In one embodiment, the StripesFilter filters out any area having a significant difference between the longest area dimension and the shortest area dimension. In one embodiment, the smaller the longest area dimension is (in pixels), the softer or weaker the requirement for the proportion between the dimensions. The following table summarizes values in accordance with one embodiment:<br>Size (pixels)  Proportion (shortest:longest)<br>Less than 18  More than 33%<br>Less than 36  More than 50%<br>More than 35  More than 75% |

TABLE 1-continued

| Filter | Use |
| --- | --- |
| WeightFilter | Requires the red pixels within the area-surrounding rectangle to have reasonable weight. In other words, the red pixels must represent a reasonable percentage of the total pixels. The WeightFilter also uses an area-surrounding rectangle, and the longest/shortest area dimensions. In one embodiment, the smaller the longest area dimension is (in pixels), the softer or weaker the requirement for the weight of the red pixels. The following table summarizes values in accordance with one embodiment:<br>Size (pixels)  Red Pixels:Total Pixels<br>Less than 18  More than 33%<br>Less than 36  More than 40%<br>More than 35  More than 55% |
| SimpleBrightnessDispersionFilter | Filters out areas having insufficient brightness dispersion. The SimpleBrightnessDispersionFilter calculates the deviation between the most bright and the least bright pixels in the identified red area, and then filters out the area if the proportion is less than 2. |
| SpectralFilter | Filters out areas not matching pre-defined spectral criteria. By way of example, the SpectralFilter will filter out identified red areas that are surrounded by pixels having color that are unlikely to be found on a human face (e.g., bright, lime green). |

After final filtering, the surviving red areas are then subjected to red eye color correction as illustrated by operation 110 of flowchart diagram 100 in FIG. 2. In one embodiment of the invention, red eye color correction includes manipulation of saturation and intensity only, and does not include hue modification. In other words, those areas determined to be red eye areas or regions are darkened, but the hue of the pixels is not changed. In another embodiment, red eye color correction includes manipulation of hue, saturation, and intensity in which the pixels of the red eye areas or regions are matched to the pixels of the natural or true eye color.

In one embodiment of the invention, red eye color correction includes processing those areas determined to be red eye effect areas using a plurality of correction algorithms. The red eye areas, having an average for hue, saturation, and intensity already calculated (see operation 104, flowchart 102, FIG. 4 above), and since the HSI and coordinates (X, Y) are always known for every pixel on the image, color correction typically involves manipulation of the saturation and intensity values as follows.

In one embodiment, for every pixel having a saturation below about 0.5, a symmetry is applied about line $I=1-S$. The distance between the line $I=1-S$ and the new pixel values, $(S_n, I_n)$, is then curtailed by two. In other words, $(S_n, I_n)$ is moved toward the line $I=1-S$ a distance equal to one half the original distance. The following formulae are applied to pixels having a saturation below about 0.5:

$$S_n = (3 + S - 3 * I)/4$$
$$I_n = (3 + I - 3 * S)/4$$

Figure 6A:
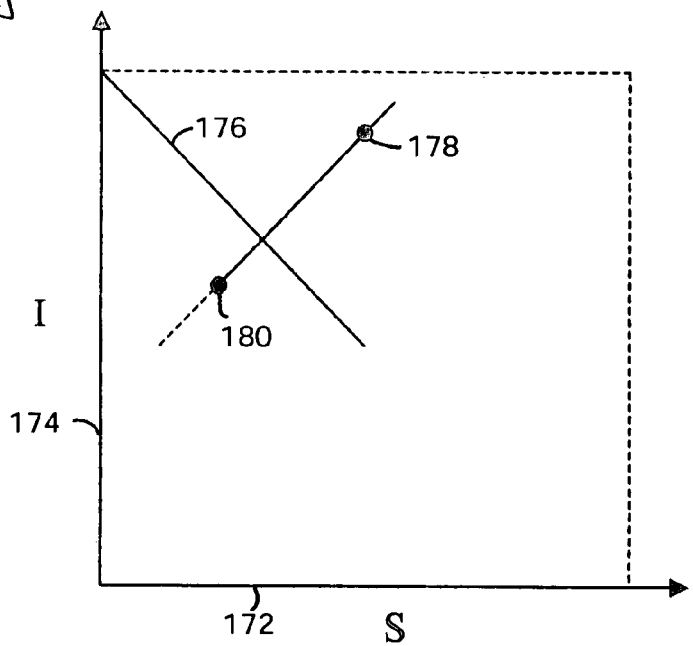
FIG. 6A shows a plot of intensity verses saturation used for color correction according to one embodiment of the invention.

S = Original saturation
I = Original intensity
$S_n$ = New saturation
$I_m$ = New intensity FIG. 6A illustrates this color correction algorithm, showing a plot 170 of intensity verses saturation according to one embodiment of the invention. As illustrated in FIG. 6A, saturation is along the horizontal axis 172, and intensity runs along the vertical axis 174. The line, I=1−S, is shown at 176. The coordinates for the original saturation and intensity (S, I) are shown at point 178, and the coordinates for the new saturation and intensity ($S_n$, $I_n$) are shown at point 180. The formula described and illustrated at FIG. 6A is particularly useful if an area of human skin is captured in an identified red eye area. The algorithm (formulae) essentially softens the changes on the low saturated human skin areas. In one embodiment, the changes effected with the above illustrated and described algorithm are almost invisible, and particularly useful if skin is captured in the red eye effect area.

In one embodiment, for every pixel having a saturation value of about 0.5 or greater, symmetry is applied only about line I=1−S. The following formulae are applied to pixels having a saturation value of about 0.5 or greater:

$$S_n = 1 - I$$
$$I_n = 1 - S$$

Figure 6B:
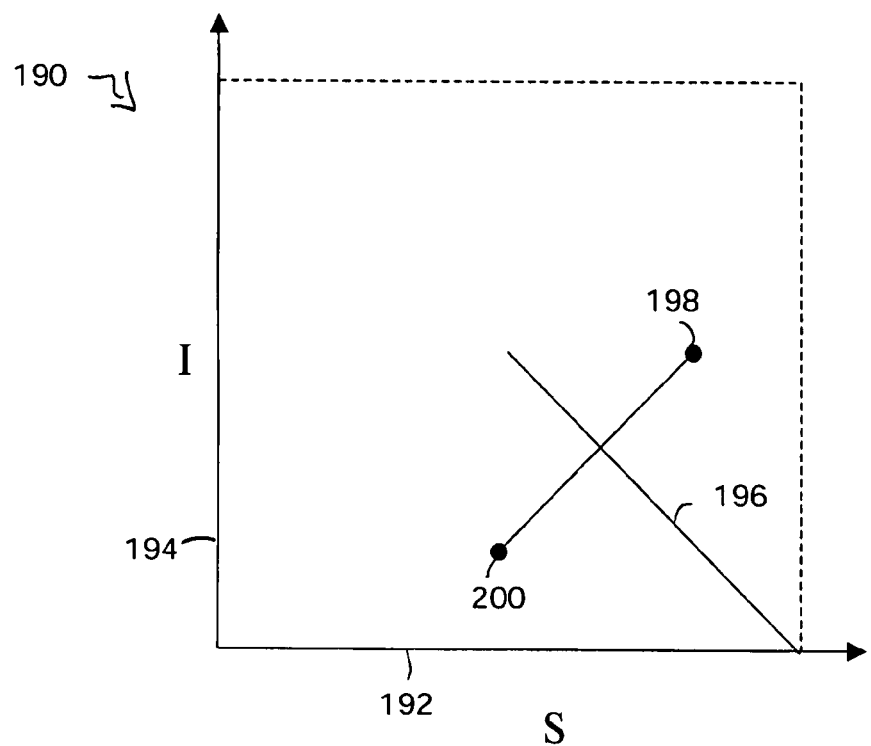
FIG. 6B shows another plot of intensity verses saturation used for color correction according to one embodiment of the invention.

S = Original saturation
I = Original intensity
$S_n$ = New saturation
$I_n$ = New intensity FIG. 6B illustrates this color correction algorithm, showing a plot 190 of intensity verses saturation according to one embodiment of the invention. As illustrated in FIG. 6B, saturation is along the horizontal axis 192, and intensity runs along the vertical axis 194. The line, I=1−S, is shown at 196. The coordinates for the original saturation and intensity (S, I) are shown at point 198, and the coordinates for the new saturation and intensity ($S_n$, $I_n$) are shown at point 200. In one embodiment of the invention, the illustrated algorithms (formulae) result in stronger darkening for more saturated areas.

In one embodiment of the invention, if $S_n$>0.35 and $I_n$<=1.01−$S_n$, in any corrected pixel, the corrected pixel is identified as remaining hard red. For any remaining hard red pixels, that is any pixels having been color corrected according to the described algorithms and still having values in which $S_n$>0.35 and $I_n$<=1.01−$S_n$, the vector ([0; 0]; [$S_n$; $I_n$]) is shortened by approximately 30%. The following formulae are applied to any identified red pixels, that have been color corrected in accordance with the above described color correction algorithms, and continue to have values in which $S_n$>0.35 and $I_n$<=1.01−$S_n$:

$$S_n = (2 * S + 0.25)/3$$
$$I_n = (2 * I + 0.25)/3$$

Figure 6C:
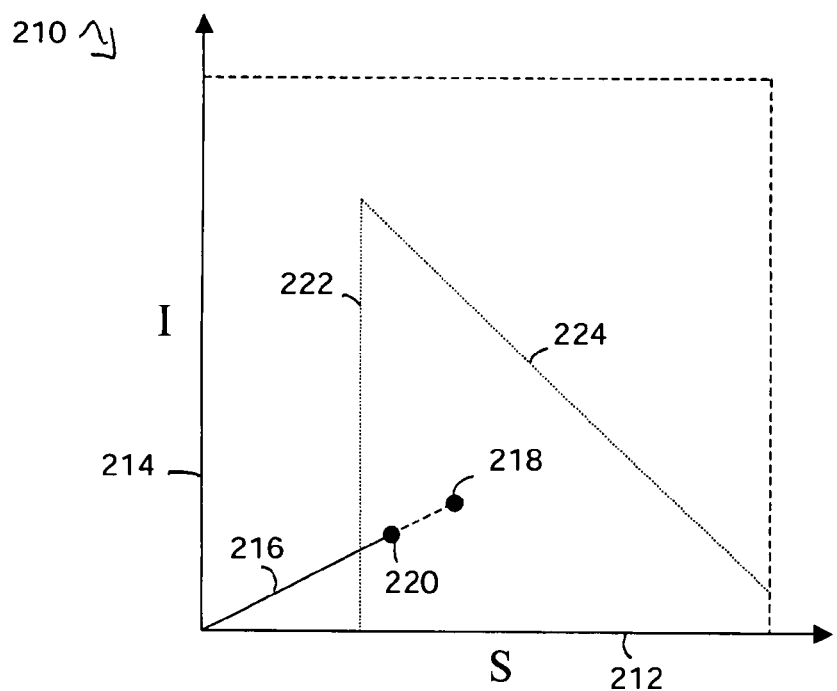
FIG. 6C shows another plot of intensity verses saturation used for color correction, according to one embodiment of the invention.

S = Original saturation
I = Original intensity
$S_n$ = New saturation
$I_n$ = New intensity FIG. 6C illustrates this color correction algorithm, showing a plot 210 of intensity verses saturation according to one embodiment of the invention. As illustrated in FIG. 6C, saturation is along the horizontal axis 212, and intensity runs along the vertical axis 214. The vector, ([0; 0]; [$S_n$; $I_n$]), is shown at 216. The line S=0.35 is shown at 222, and the line 1.01−S is shown at 224. The coordinates for the original saturation and intensity (S, I) are shown at point 218, and the coordinates for the new saturation and intensity (Sn, In) are shown at point 220. In one embodiment of the invention, the illustrated algorithms (formulae) result in dark red pixels to appear as virtually black pixels.

With the embodiments described herein in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, DVD-ROM, DVD-R/RW, DVD-RAM, DVD+R/+RW, magnetic tapes, and other optical data storage devices. The computer readable medium can also be distributed over network coupled computer systems so that the computer readable code is stored and executed in a distributed fashion.

In summary, the present invention provides a method and system for the automatic detection and correction of red eye effect in digital images. As digital image use and distribution become more popular and commonplace, so too should the ease of processing and manipulation of digital images be for the average consumer. Embodiments of the present invention provide the automation to realize more user-friendly implementations. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. A method for performing red eye correction in an image, comprising:
providing a digital image, the digital image being represented by electrical signals in a computer system;
identifying a red eye region in the digital image; and
applying a color correction to each pixel in the identified red eye region; and wherein the identifying of the red eye region comprises:
identifying hard red areas, each of the hard red areas comprising a grouping of pixels having a color defined within a polyhedral region of a three dimensional hue-saturation-intensity (HSI) color space having a first axis defining hue, a second axis defining intensity, and a third axis defining saturation; and
excluding ones of the hard red areas from being identified as the red eye region when a virtual weight center of the hard red area deviates more than a selected percentage from a geometric center of the hard red area, the virtual weight center having an x-coordinate equal to a sum of an x-coordinate of each pixel of the hard red area divided by a number of pixels in the hard red area, and a y-coordinate equal to a sum of a y-coordinate of each of the pixels within the hard red area divided by the number of pixels in the hard red area.

2. The method for performing red eye correction in an image as recited in claim 1, wherein each dimension of hue, saturation, and intensity is scaled to be defined by a segment having coordinates [0.0; 1.0] and the color defined within the polyhedral region includes colors within a defined hue segment, wherein the defined hue segment is within one of [0.0; 0.0694] and [0.9167; 1.0].

3. The method for performing red eye correction in an image as recited in claim 2, wherein the HSI color space as projected on a two-dimensional plot of saturation verses intensity is limited to a region circumvented by a polyline on the plot of saturation verses intensity, the polyline being defined by coordinates consisting essentially of about [0.0; 1.0], [0.5; 1.0], [0.55; 0.34], and [1.0; 0.3].

4. The method for performing red eye correction in an image as recited in claim 1, further comprising excluding ones of the hard red areas from being identified as the red eye region based on at least one of: a size of the hard red area, a shape of the hard red area, a color weight of the hard red area, a brightness dispersion of the hard red area, and a spectral criteria of pixels surrounding the hard red area.

5. The method for performing red eye correction in an image as recited in claim 1, further comprising:
identifying a set of final red areas the set of final red areas including the hard red areas and same color areas, each of the same color areas being a contiguous set of pixels built around a real color center of a corresponding hard red area wherein each pixel of the contiguous set of pixels has a color that is within a predetermined color distance from an average color of the hard red area, the real color center being a pixel of the hard red area having an HSI value closest to the average color of the hard red area;
excluding one of the final red areas from being identified as the red eye region based on at least one of: a size of the final red area, a shape of the final red area, a color weight of the final red area, a brightness dispersion of the final red area, and a spectral criteria of pixels surrounding the final red area.

6. A method for performing red eye correction in a digital image, comprising:
identifying hard red areas in the digital image, each of the hard red areas comprising a grouping of pixels having a color defined within a polyhedral region of a three dimensional hue-saturation-intensity (HSI) color space having a first axis defining hue, a second axis defining intensity, and a third axis defining saturation;
identifying a real color center for the identified hard red areas, the real color center being defined as at least one pixel defining a point within the identified hard red area, the at least one pixel having values for hue, saturation and intensity closest of all pixels within the hard red area to the arithmetic averages of all pixels within the hard red area for hue, saturation, and intensity;
identifying a set of final red areas, the set of final red areas including the hard red areas and same color areas, each of the same color areas being a contiguous set of pixels built around the real color centers of the hard red areas wherein each pixel of the contiguous set of pixels has a color that is within a predetermined color distance from an average color of the hard red area;
filtering out non-red-eye red areas from the set of final red areas, the filtering including the disregarding of ones of the final red having areas that are too large for red eye effect, areas of an inappropriate shape to have red eye; areas of insufficient color intensity; areas of insufficient brightness dispersion, and areas failing to match a pre-determined spectral criteria;
defining a region having red eye effect, the region having red eye effect being one of the final red areas that survived the filtering; and
applying a color correction to the defined region,
wherein the method is performed automatically and without user input to define and to correct the region having red eye effect.

7. The method of claim 6, wherein the applying of the color correction includes manipulation of saturation and intensity of pixels within the defined region.

8. The method of claim 6, wherein the applying of the color correction includes manipulating the hue, saturation, and intensity of pixels within the defined region to match a hue, saturation, and intensity of an identified true eye color.

9. Computer readable media encoded with a computer program for removal of red eye effect in a digital image, the computer program comprising:
program instructions for automatically defining a region of the digital image having red eye effect; and
program instructions for automatically applying a color correction to the defined region,
wherein the defining of the region of the digital image having the red eye effect comprises:
identifying hard red areas, each of the hard red areas comprising a grouping of pixels having a color defined within a polyhedral region of a three dimensional hue-saturation-intensity (HSI) color space having a first axis defining hue, a second axis defining intensity, and a third axis defining saturation; and
excluding ones of the hard red areas from being identified as the red eye region when a virtual weight center of the hard red area deviates more than a selected percentage from a geometric center of the hard red area, the virtual weight center having an x-coordinate equal to a sum of an x-coordinate of each pixel of the hard red area divided by a number of pixels in the hard red area, and a y-coordinate equal to a sum of a y-coordinate of each of the pixels within the hard red area divided by the number of pixels in the hard red area.

10. The computer readable media of claim 9, wherein the computer program further comprises:
program instructions for excluding ones of the hard red areas too large for red eye effect, ones of the hard red areas having an inappropriate shape to have red eye; ones of the hard red areas of insufficient color intensity; ones of the hard red areas of insufficient brightness dispersion, and ones of the hard red areas in which surrounding pixels fail to match a pre-determined spectral criteria.

11. The computer readable media of claim 9, wherein the program instructions for automatically applying a color correction to the defined region include instructions to manipulate saturation and intensity of pixels within the defined region.

12. The computer readable media of claim 9, wherein the program instructions for automatically applying a color correction to the defined region include instructions to manipulate hue, saturation, and intensity of pixels within the defined region to match the hue, saturation, and intensity of an identified true eye color in the digital image.

* * * * *